US011086924B2

(12) United States Patent
Watanabe et al.

(10) Patent No.: US 11,086,924 B2
(45) Date of Patent: Aug. 10, 2021

(54) IMAGE SEARCH DEVICE AND IMAGE SEARCH METHOD

(71) Applicant: HITACHI, LTD., Tokyo (JP)

(72) Inventors: Yuki Watanabe, Tokyo (JP); Kenichi Morita, Tokyo (JP); Qingzhu Duan, Tokyo (JP); Atsushi Hiroike, Tokyo (JP); Tomokazu Murakami, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 169 days.

(21) Appl. No.: 16/489,055

(22) PCT Filed: Dec. 28, 2017

(86) PCT No.: PCT/JP2017/047398
§ 371 (c)(1),
(2) Date: Aug. 27, 2019

(87) PCT Pub. No.: WO2018/159095
PCT Pub. Date: Sep. 7, 2018

(65) Prior Publication Data
US 2020/0065324 A1 Feb. 27, 2020

(30) Foreign Application Priority Data
Feb. 28, 2017 (JP) .............................. JP2017-035677

(51) Int. Cl.
*G06F 16/532* (2019.01)
*G06F 16/538* (2019.01)
*G06F 16/535* (2019.01)

(52) U.S. Cl.
CPC .......... *G06F 16/532* (2019.01); *G06F 16/535* (2019.01); *G06F 16/538* (2019.01)

(58) Field of Classification Search
CPC ...... G06F 16/43; G06F 16/432; G06F 16/434; G06F 16/53; G06F 16/532
See application file for complete search history.

(56) References Cited

U.S. PATENT DOCUMENTS

| 6,859,802 B1 | 2/2005 | Rui |
| 2004/0267740 A1 | 12/2004 | Liu et al. |
| 2015/0154472 A1 | 6/2015 | Yano et al. |

FOREIGN PATENT DOCUMENTS

| JP | 2015-106300 A | 6/2015 |
| JP | 2016-167237 A | 9/2016 |

OTHER PUBLICATIONS

International Search Report, dated Mar. 27, 2018, which issued during the prosecution of International Application No. PCT/JP2017/047398, which corresponds to the present application.
(Continued)

*Primary Examiner* — William Spieler
(74) *Attorney, Agent, or Firm* — Baker Botts L.L.P.

(57) ABSTRACT

The invention is directed to an image search device including a search condition input unit that receives a search condition for searching for an image, a query generation unit that generates a first query based on the search condition, an image search unit that searches for an image in a database based on the first query, a relevance estimation unit that estimates relevance between a plurality of images selected by a predetermined operation among images hit by a search, a query correction unit that generates a second query based on the relevance between the plurality of images, and a function of displaying the second query generated by the query correction unit on an interface.

8 Claims, 14 Drawing Sheets

(56) References Cited

OTHER PUBLICATIONS

Singapore Search Report and Written Opinion dated Jul. 1, 2020 for Singapore Application No. 11201907883V.
Kovashka, A., et al., "WhittleSearch: Interactive Image Search with Relative Attribute Feedback", arXiv:1505.04141v2 [cs.CV], May 18, 2015, pp. 1-26.
Extended European Search Report dated Nov. 4, 2020 for European Application No. 17898758.2.
Y. Rui, et al., "Relevance Feedback: A Power Tool for Interactive Content-Based Image Retrieval," IEEE Transactions on Circuits and Systems for Video Technology, vol. 8, No. 5, 1998, pp. 644-655.

[FIG. 1]
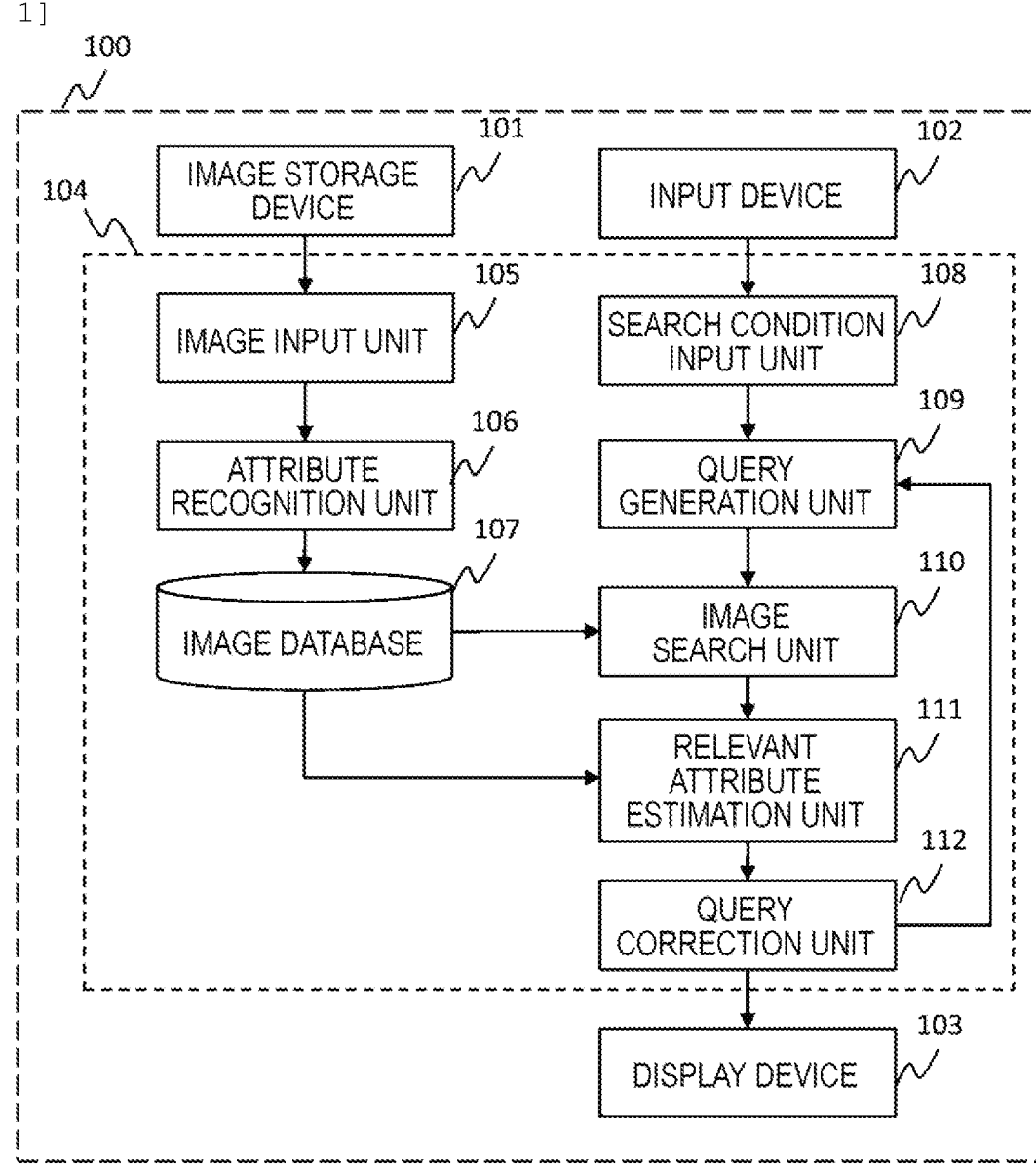

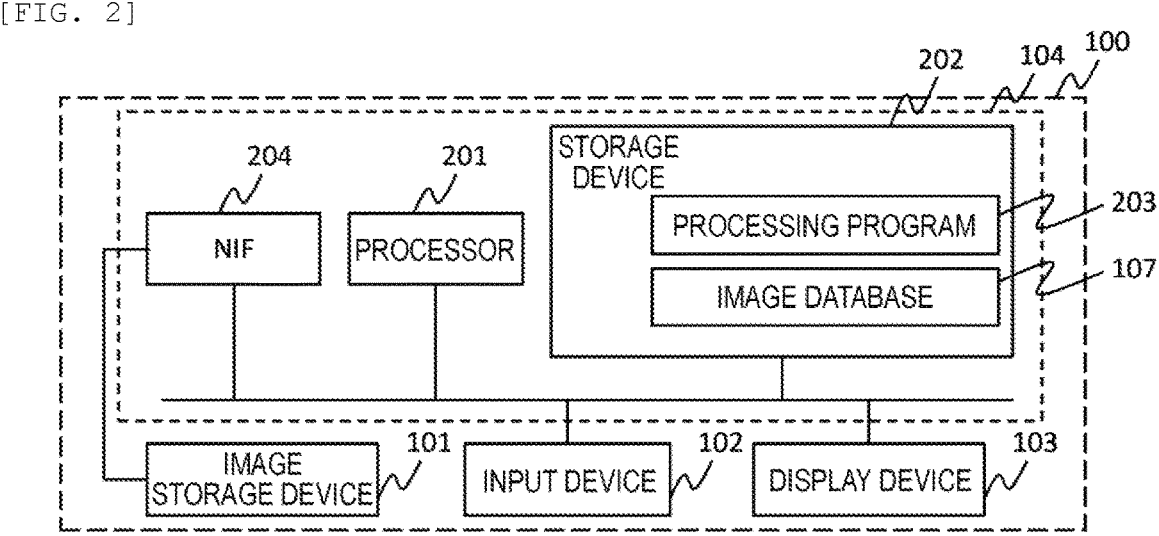

[FIG. 4]
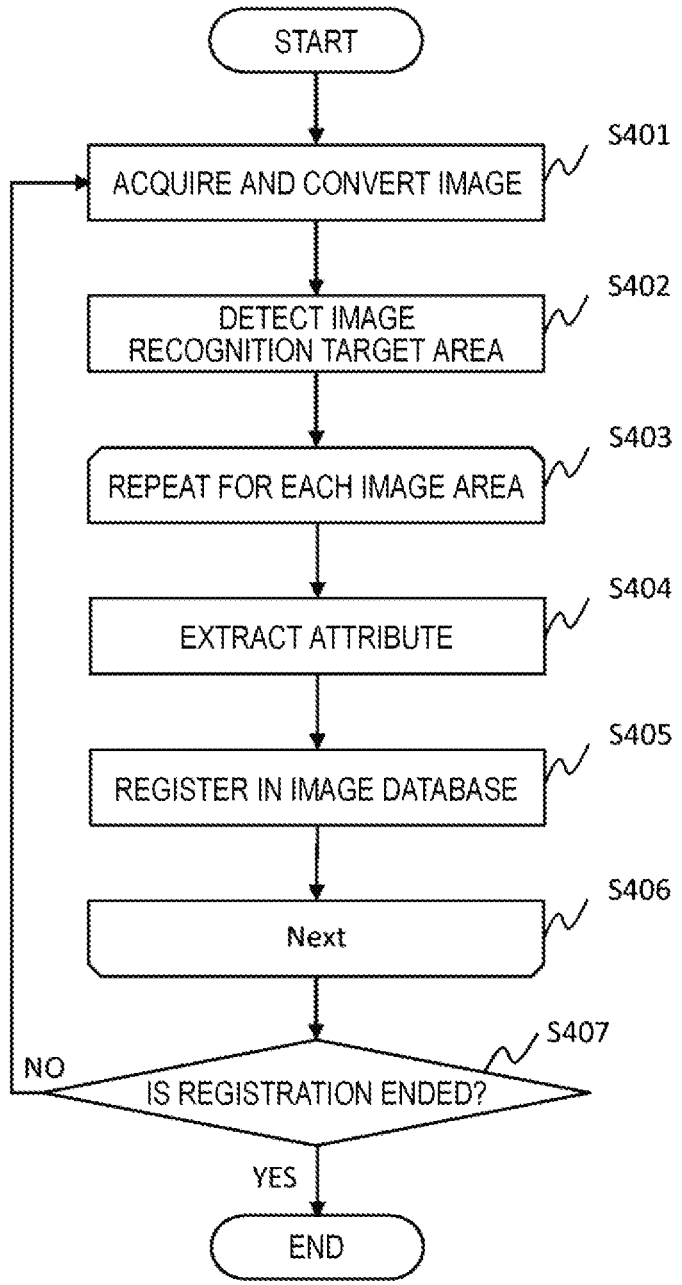

[FIG. 5]
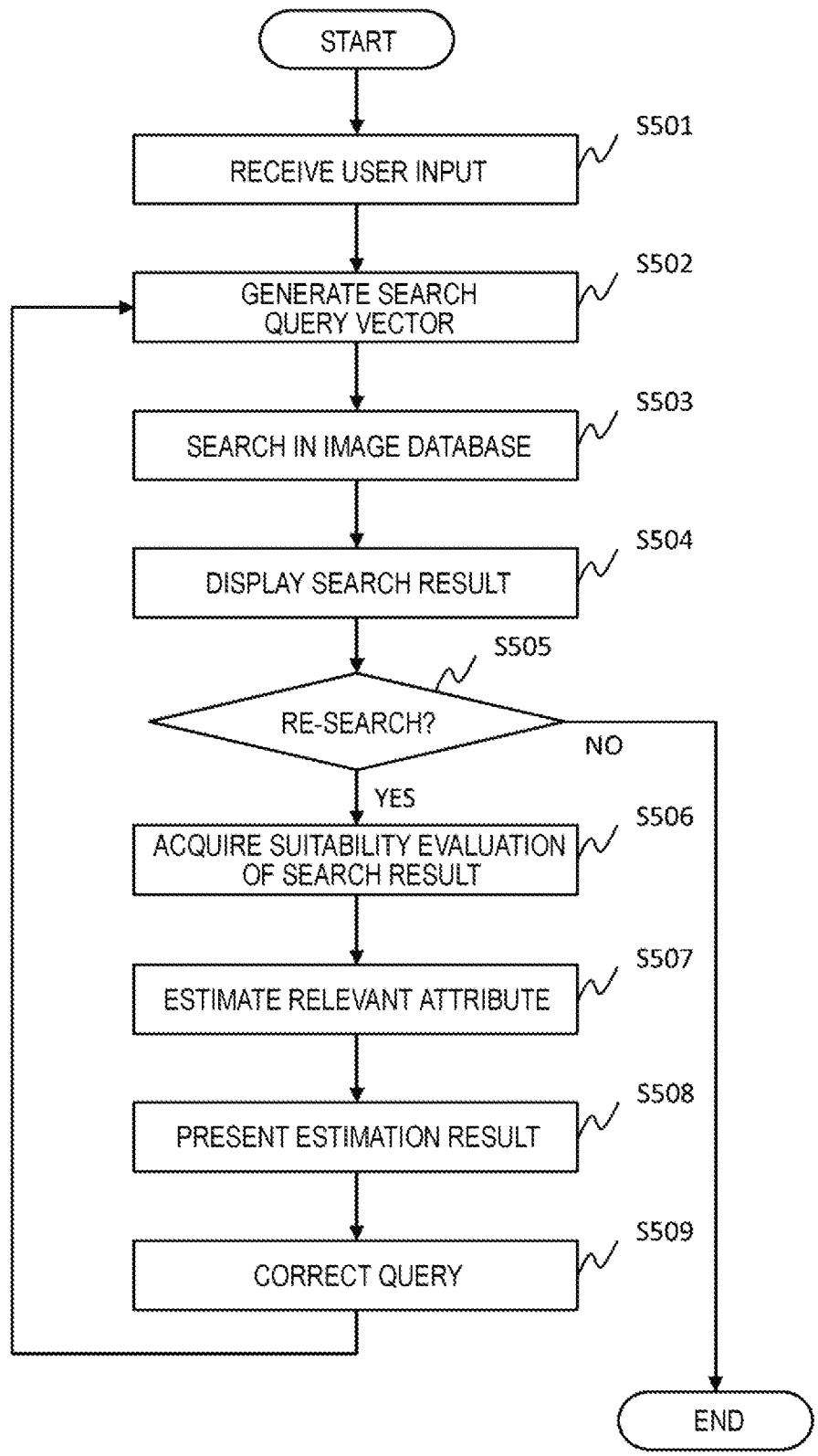

[FIG. 6]
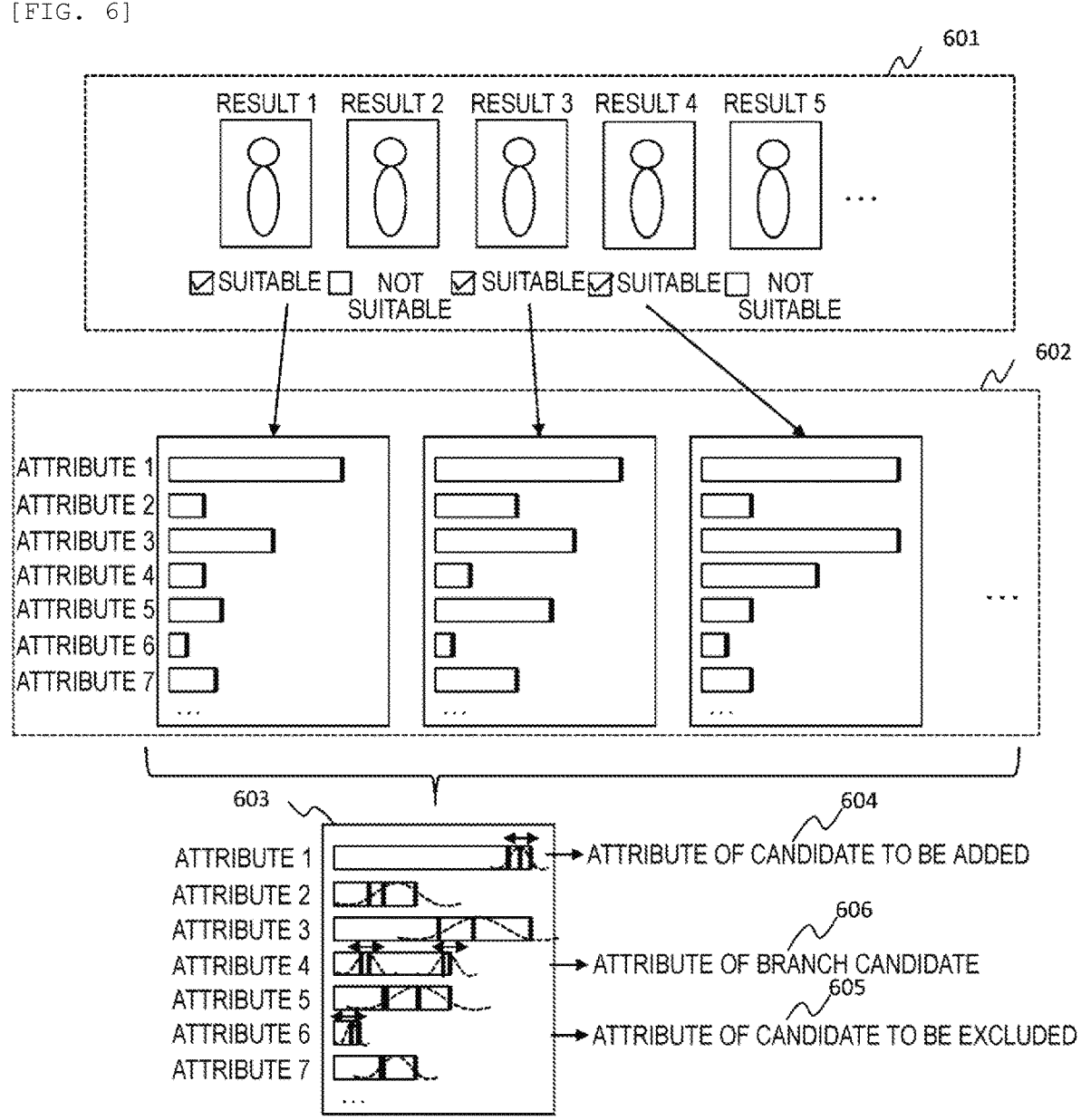

[FIG. 7]
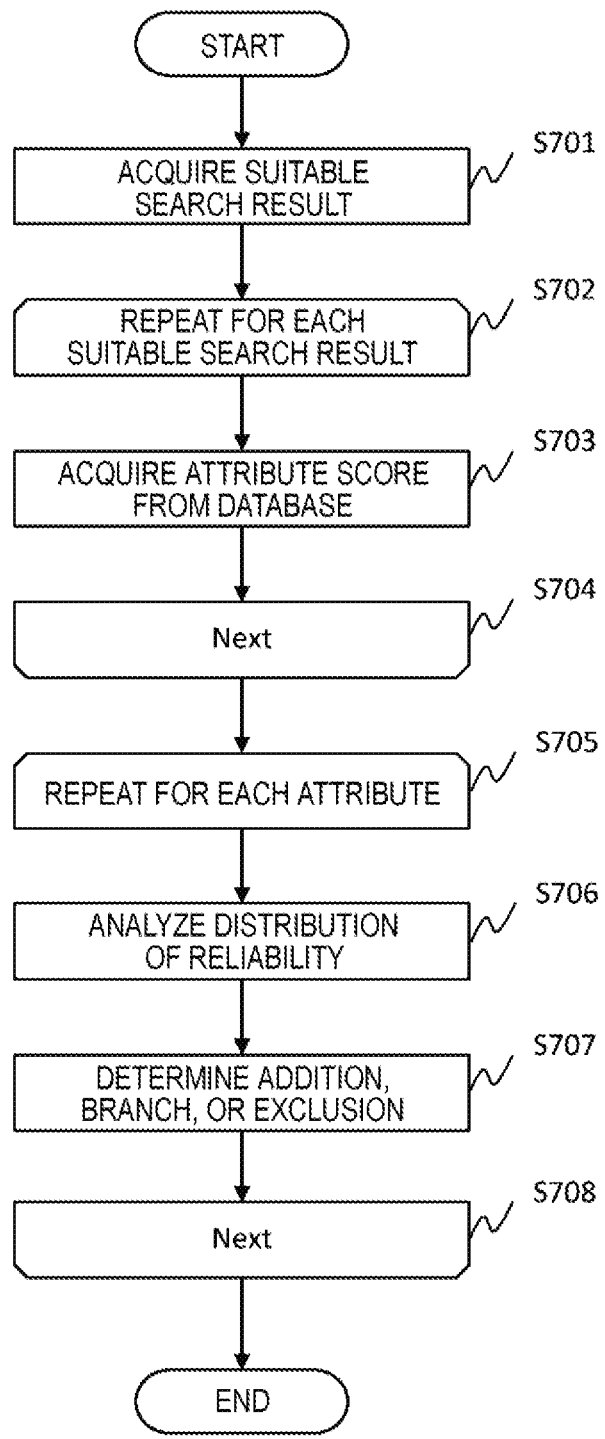

[FIG. 8]
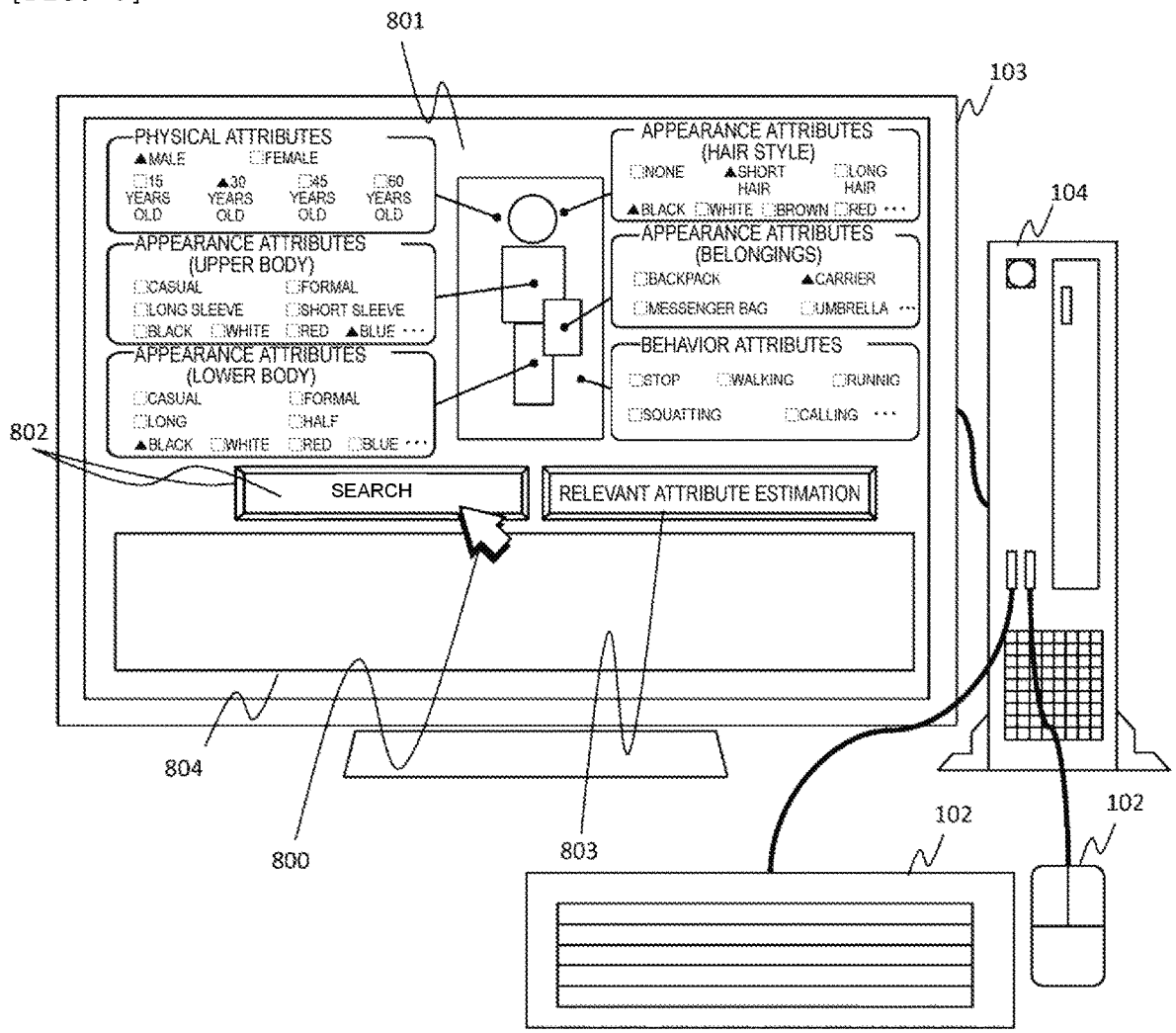

[FIG. 9]
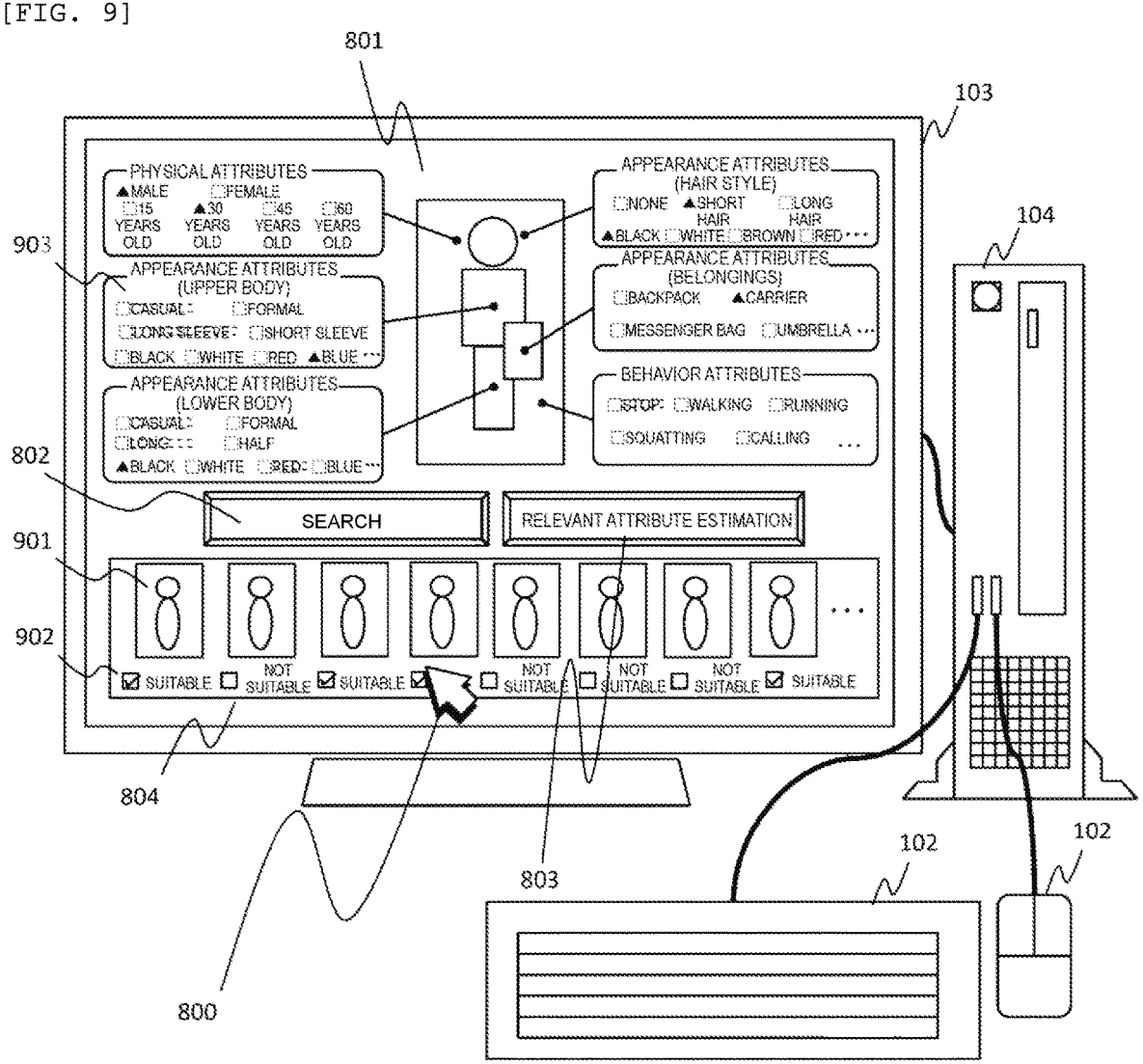

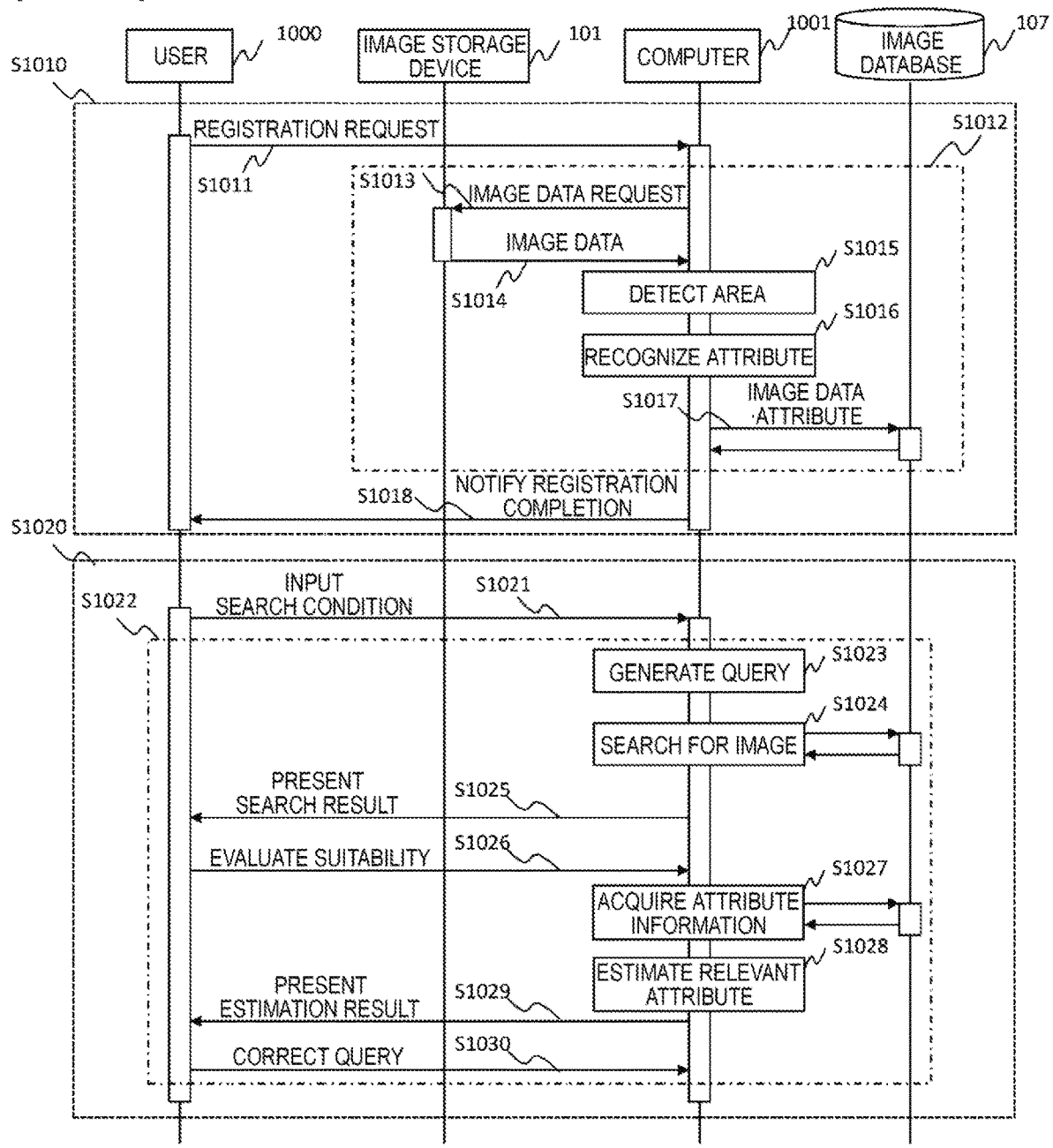
[FIG. 10]

[FIG. 11]
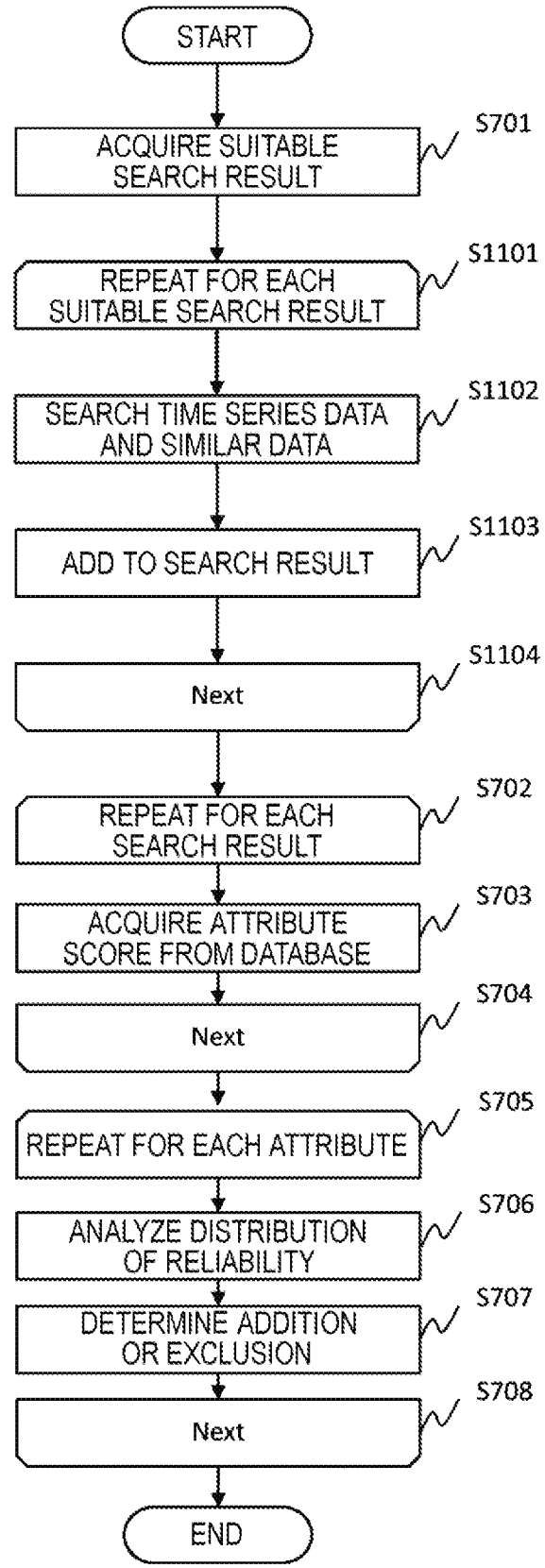

[FIG. 12]

| IMAGE ID | IMAGE DATA | ATTRIBUTE RELIABILITY 1 | FEATURE AMOUNT 1 | ATTRIBUTE RELIABILITY 2 | FEATURE AMOUNT 2 | ... | TRACKING ID |
|---|---|---|---|---|---|---|---|
| 1 | Binary | 0.9 | [39, 223, 192, ...] | 0.0 | [29, 52, 242, ...] | ... | 1 |
| 2 | Binary | 0.4 | [19, 226, 17, ...] | 0.9 | [248, 35, 158, ...] | ... | 2 |
| 3 | Binary | 0.8 | [29, 231, 207, ...] | 0.3 | [239, 27, 163, ...] | ... | 2 |
| ... | ... | ... | ... | ... | ... | ... | ... |

[FIG. 13]
FEATURE AMOUNT MAPS OF IMAGES
WITH HIGHLY RELIABLE ATTRIBUTE 1
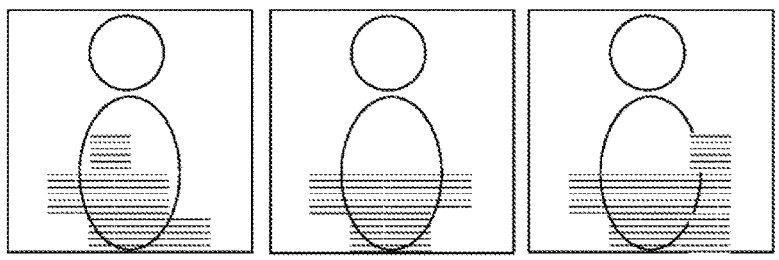
ATTENTION PROBABILITY
MAP OF ATTRIBUTE 1
| 0 | 0 | 0 | 0 | 0 | 0 |
|---|---|---|---|---|---|
| 0 | 0 | 0 | 0 | 0 | 0 |
| 0 | 0 | 0 | 0 | 0 | 0 |
| 0 | 0 | 0.2 | 0 | 0.4 | 0 |
| 0 | 0.8 | 0.8 | 0.8 | 0.8 | 0 |
| 0 | 0.6 | 0.8 | 0.8 | 0.6 | 0 |
ATTRIBUTE 2 AND ATTRIBUTE 3
ALREADY SELECTED
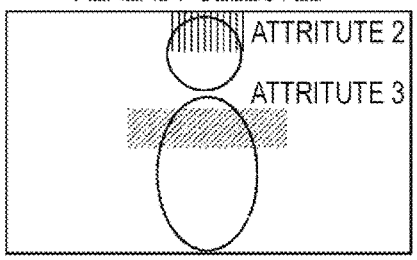
ATTRITUTE 2
ATTRITUTE 3
| 0 | 0 | 0.8 | 0.8 | 0 | 0 |
|---|---|---|---|---|---|
| 0 | 0 | 0 | 0 | 0 | 0 |
| 0 | 0.4 | 0.8 | 0.8 | 0.4 | 0 |
| 0 | 0 | 0 | 0 | 0 | 0 |
| 0 | 0 | 0 | 0 | 0 | 0 |
| 0 | 0 | 0 | 0 | 0 | 0 |
ATTRIBUTE 1 CAN BE ARRANGED

[FIG. 14]
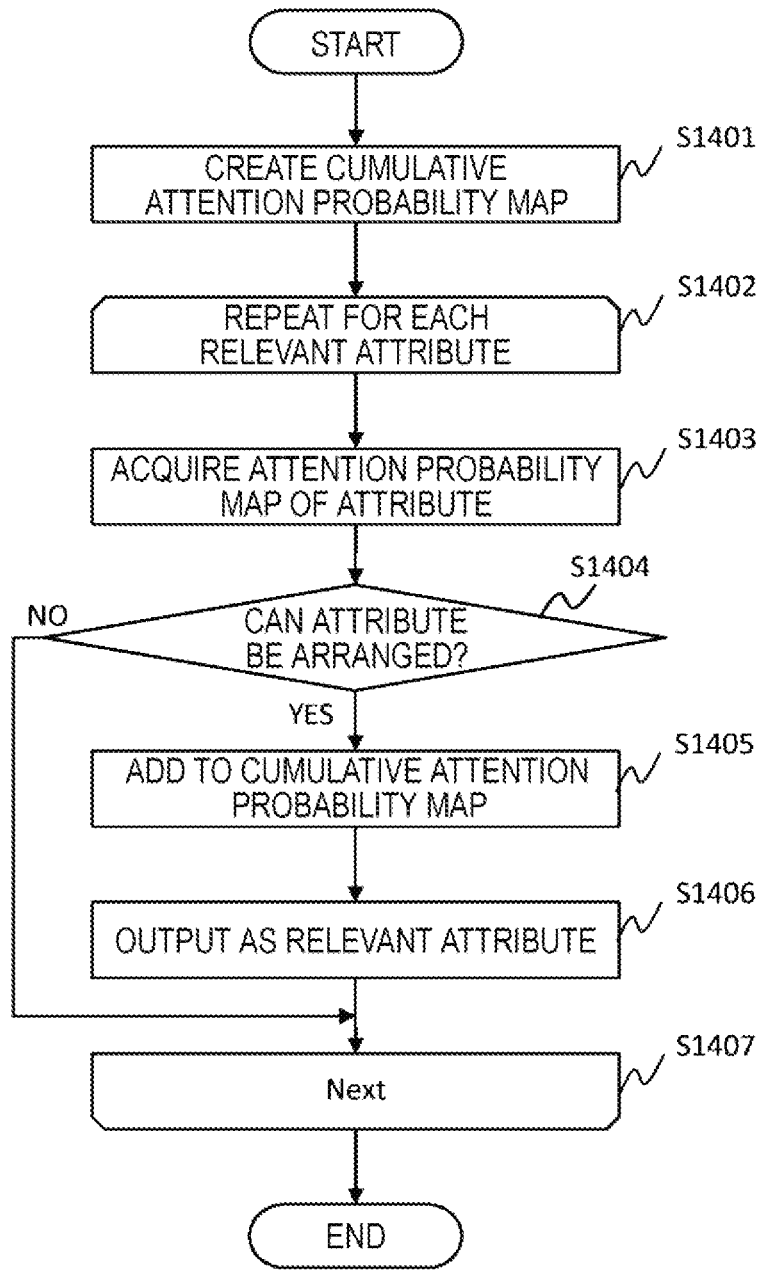

[FIG. 15]
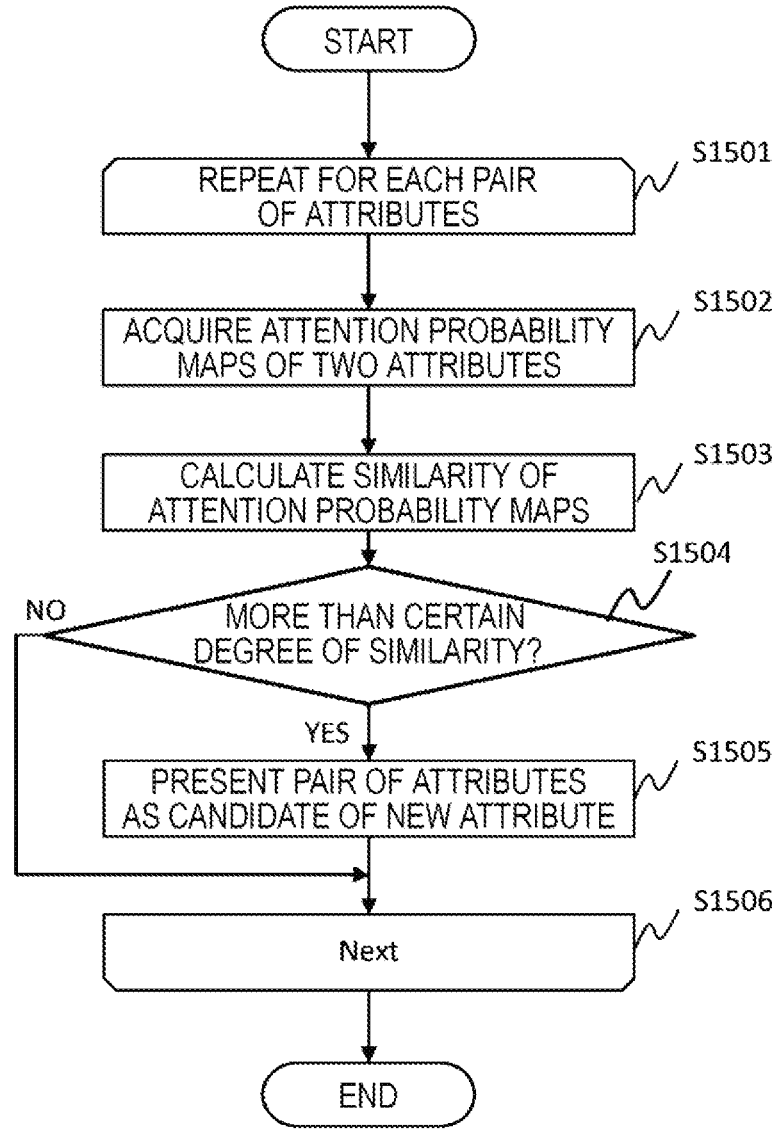

IMAGE SEARCH DEVICE AND IMAGE SEARCH METHOD

CROSS REFERENCE TO PRIOR APPLICATIONS

This application is a U.S. National Phase application under 35 U.S.C. § 371 of International Application No. PCT/JP2017/047398, filed on Dec. 28, 2017, which claims benefit of priority to Japanese Patent Application No. 2017-035677, filed on Feb. 28, 2017. The International Application was published in Japanese on Sep. 7, 2018 as WO 2018/159095 A1 under PCT Article 21(2). The contents of the above applications are hereby incorporated by reference.

TECHNICAL FIELD

The present invention relates to an image search device and an image search method.

BACKGROUND ART

The need for high-speed search and classification of large-scale image data is increasing with the digital archiving of television images and the spread of video distribution services on the Internet. In addition, expectations for analysis of surveillance images accumulated for security are increasing. Since it is difficult to manually add text information to these huge images, there is a need for improving the efficiency of search by using similar image search based on image feature amounts and metadata automatically added by image recognition technology. As a background art in this technical field, there is disclosed in JP-A-2015-106300 (PTL 1).

For example, PTL 1 discloses an image search device capable of evaluating the identification performance for each attribute based on statistical information of attributes of a search target and a non-search target to perform an efficient search without depending on the bias of the attribute of the search target.

CITATION LIST

Patent Literature

PTL 1: JP-A-2015-106300

SUMMARY OF INVENTION

Technical Problem

PTL 1 does not disclose an idea for reflecting a user's subjective search intention accurately in an image search. A configuration for generating a new query based on the relevance between a plurality of images specified by the user among a large number of images hit by image search is not disclosed, and the user's search intention cannot be reflected in the image search with high accuracy.

Solution to Problem

In order to solve the above problems, an image search device provided by the present invention includes a search condition input unit that receives a search condition for searching for an image, a query generation unit that generates a first query based on the search condition, an image search unit that searches for an image in a database based on the first query, a relevance estimation unit that estimates relevance between a plurality of images selected by a predetermined operation among images hit by a search, a query correction unit that generates a second query based on the relevance between the plurality of images, and a function of displaying the second query generated by the query correction unit on an interface.

Advantageous Effects of Invention

According to the present invention, it is possible to generate a new query based on the relevance between a plurality of images specified by a user among a large number of images hit by an image search, and as a result, the user's search intention can be reflected in the image search with high accuracy.

BRIEF DESCRIPTION OF DRAWINGS

FIG. 1 is a block diagram showing a configuration of an image search system.

FIG. 2 is a block diagram showing a hardware configuration of the image search system.

FIG. 3 is a diagram showing a structure of an image database.

FIG. 4 is a flowchart showing database registration processing.

FIG. 5 is a flowchart showing image search processing.

FIG. 6 is a diagram showing relevant attribute estimation processing.

FIG. 7 is a flowchart showing the relevant attribute estimation processing.

FIG. 8 is a diagram showing a search screen.

FIG. 9 is a diagram showing screen transition of the search screen.

FIG. 10 is a sequence diagram showing processing of the entire system.

FIG. 11 is a diagram showing relevant attribute estimation in Example 2.

FIG. 12 is a diagram showing an example of an extended structure of an image database in Example 2.

FIG. 13 is a conceptual diagram showing relevant attribute estimation processing in Example 3.

FIG. 14 is a flowchart showing the relevant attribute estimation processing in Example 3.

FIG. 15 is a flowchart showing new attribute generation processing in Example 4.

DESCRIPTION OF EMBODIMENTS

Hereinafter, embodiments of the present invention will be described with reference to accompanying drawings. The present embodiments are merely examples for realizing the present invention and do not limit the technical scope of the present invention. The same reference numerals are given to the same configuration in each drawing.

Example 1

An image search device according to the present embodiment recognizes a large number of attributes from an image to be newly registered and registers attribute information with recognition reliability in an image database. At the time of search, an attribute set is acquired according to an input search condition, a search query vector is generated from the attribute set, and data having a close distance between vectors is acquired from the image database. A user evaluates the suitability of the acquired search result and inputs the result to the image search device. The image search device acquires the attributes of a suitable search result, obtains the distribution of reliability by statistical analysis, and presents the user with attributes that meet predetermined condition as attributes to be added or excluded. The user can obtain an attribute set reflecting the search intention by repeating the search with reference to the presented attributes, and the accuracy of the image search is improved.

Here, "attribute" mentioned here refers to information for identifying a person and includes, for example, physical attributes such as gender and age, appearance attributes such as "black hair", "wearing glasses", and "carrying carrier", and behavioral characteristics such as "stop" and "squat". Details will be described later.

Further, "reliability" mentioned here is a value set for each attribute and indicating the probability that the attribute exists in a predetermined area and is calculated based on statistical information. Details will be described later.

In the following, "image" means information indicating moving images or still images, and "video" means information including audio data other than images.

FIG. 1 is a block diagram showing a configuration example of an image search system 100 of Example 1. As a use case of the image search system. 100, a case where a police organization staff wants to conduct a search for a specific suspicious person from within the surveillance camera images in a specific station yard, or a case where a user such as an employee of a large-scale commercial facility management company wants to search for a lost child, a lost property, or the like from within the surveillance camera images in the facility, may be considered, but the use case is not limited thereto. Each configuration will be described below.

The image search system. 100 efficiently performs a video search using a plurality of attributes by searching an image database 107 with the attributes input by the user as a search condition, estimating the attributes to be added to the search condition based on the suitability evaluation of the search result, and providing a function and interface to present the attributes to the user. The image search system 100 includes an image storage device 101, an input device 102, a display device 103, and an image search device 104. The image storage device 101 is a storage medium for storing still image data or moving image data and is configured by using a computer with built-in hard disk drive or a storage system connected via a network such as network attached storage (NAS) or storage area network (SAN). In addition, the image storage device 101 may be a cache memory that temporarily stores image data continuously input from a camera.

The input device 102 is an input interface such as a mouse, a keyboard, a touch device, and the like, for transmitting the user's operation to the image search device 104. The display device 103 is an output interface such as a liquid crystal display and is used to display the search result of the image search device 104 and operate interactively with the user, and the like.

The image search device 104 is a device that performs registration processing for extracting information required for the search to register the information in the database and search processing using the registered data. The registration processing will be described below. The details of the registration processing will also be described with reference to the flowchart of FIG. 4. In the registration processing, a recognition target area is extracted from the still image data or the moving image data stored in the image storage device 101 as necessary, and attributes are acquired from the extracted area by image recognition processing and registered in the image database 107. At this time, a plurality of attributes are extracted from one processing area, and the reliability of the image recognition processing is given to each attribute. The reliability of the attribute is given by a real value of 0 or more and 1 or less, and the closer to 1, the higher the probability that the processing area includes the attribute. For example, in the case of appearance attributes, in a case where a face area is extracted from a person present in an image, "wearing glasses" is acquired as an attribute from the face area, and the reliability "0.9" is output, it means that the face area includes the "wearing glasses" attribute with a probability of 90%. The method of calculating the reliability will be described later.

In addition, the image search device 104 searches the image database 107 for an image meeting the search condition by using the search condition specified by the user from the input device 102 and performs search processing for presenting information on the display device 103. In the search processing, the user specifies a plurality of attributes as a search condition. The user determines the attributes to be used for the search by, for example, clicking a check box for each attribute displayed on the display device 103. Details will be described later with reference to FIG. 8. If it is possible to specify the attribute to be used, the attribute may be input by text or voice.

The image search device 104 searches the data stored in the image database 107 for an image matching the specified attributes and displays the search result on the display device 103. The user confirms the displayed search result, determines the suitability as to whether the search result is a desired search result, and inputs the search result to the image search device 104. The image search device 104 estimates the attributes to be added to the search condition by examining the attributes that appears in common in the suitable search result, and presents the attributes to the user. The user efficiently selects a suitable set of attributes for searching for a desired image from among a large number of attributes prepared in the system by adding the presented attributes to the condition and performing re-search.

The image search device 104 is configured with an image input unit 105, an attribute recognition unit 106, the image database 107, a search condition input unit 108, a query generation unit 109, an image search unit 110, a relevant attribute estimation unit 111, and a query correction unit 112.

The image input unit 105 receives an input of still image data or moving image data from the image storage device 101 and converts the data into a data format to be used inside the image search device 104. For example, in a case where the data received by the image input unit 105 is moving image data, the image input unit 105 performs moving image decoding processing to decode the data into frames (still image data format).

The attribute recognition unit 106 recognizes an attribute included in the input image. Attribute recognition is performed on an object basis defined in the system. For example, in the case of a system that treats a person as one object, first, the person included in the image is detected, and the attribute recognition processing is performed for each detected area. A well-known method can be used for detection processing.

In order to perform attribute recognition, it is necessary to prepare in advance a classifier that responds to a specific image feature. When automatic learning of image feature amounts using deep learning in recent years is used, it is possible to increase the number of attribute classifiers relatively easily. It is assumed that the attribute recognition unit 106 according to the present embodiment recognizes, for example, tens to hundreds of types of attributes and outputs the reliability of each attribute based on statistical information. If the attribute relates to a person, the attribute to be recognized is, for example, gender (male, female) representing physical and appearance information, age group (teens, twenties, thirties), clothes (casual, formal, color type), posture (body direction, face direction), and the like. In the case of receiving an input of a moving image, behavior (walking, running, squatting) may be set as an attribute by using time-series features. Furthermore, information other than the image information included in the video may be recognized as an attribute. For example, data such as an audio signal, a distance sensor, or a temperature sensor included in a video may be given as an input of the attribute recognition processing.

The image database 107 holds image data and attribute data obtained by the registration processing. The image database 107 can search for registration data satisfying a given condition, or read out data of a specified ID in response to a query of each unit of the image search device 104. Details of the structure of the image database 107 will be described later with reference to FIG. 3.

The above is the operation of each unit in the registration processing of the image search device 104. Next, the operation of each unit in the search processing of the image search device 104 will be described. The details of the search processing will also be described with reference to the flowchart of FIG. 5.

The search condition input unit 108 receives a search condition specified by the user via the input device 102. The search condition is given as an attribute set consisting of one or more attributes, but the specification thereof does not necessarily have to be a method of clicking check boxes in the input screen. For example, the image itself may be received and converted into an attribute set by performing processing similar to that of the attribute recognition unit 106. Alternatively, the image may be converted into an attribute set by performing speech recognition or natural language processing using speech or text as an input. In addition, each attribute included in the search condition may be provided with weight information indicating how much importance should be given at the time of search. Furthermore, the search condition input unit 108 may specify an attribute to be excluded as a search condition. For example, when it is desired to exclude a person wearing glasses, the "wearing glasses" attribute is added to the attribute set to be excluded.

The query generation unit 109 converts the attribute set obtained by the search condition input unit 108 into a search query. The search query is represented by a numeric vector. For example, in the case of searching for an image including an attribute 1 and an attribute 2 and not including an attribute 3, the search query vector $V_q=(1, 1, 0)$.

The image search unit 110 obtains corresponding registered data from the image database 107 by using the query vector obtained by the query generation unit 109. In the search processing, the distance between the query vector and the vector of the registered data is calculated, and rearranged in the order of close distance, and a fixed number is output. The squared Euclidean distance is used for distance calculation. For example, assuming that the query vector is $V_q=(q_1, q_2, q_3, \ldots)$ and the vector of registered data is $V_p=(p_1, p_2, p_3, \ldots)$, the squared Euclidean distance $d(V_p, V_q)$ is calculated by $d(V_p, V_q)=(p_1-q_1)^2+(p_2-q_2)^2+(p_3-q_3)^2+\ldots$. Here, "^2" means a square. As the squared Euclidean distance is smaller, it can be considered as an image closer to registered data matching the search condition. As described above, weight information may be given according to the importance of the attribute. For example, assuming that the weight vector $W=(w_1, w_2, w_3, \ldots)$, $d(p_1, q_1, W)=w_1\times(p_1-q_1)^2+w_2\times(p_2-q_2)^2+w_3\times(p_3-q_3)^2+\ldots$. In this example, the squared Euclidean distance is used as an index of similarity between images, but as long as the calculation method can evaluate how much the query matches the registered data, it is possible to search for data by using any index.

The relevant attribute estimation unit 111 is a processing unit that acquires attribute information of a search result suitable for the search condition from the image database 107 and estimates a relevant attribute. Whether or not the search result is suitable for the search condition may be confirmed by the user and input to the image search device 104, or a search result having the distance obtained by the image search unit 110 equal to or less than a predetermined value may be automatically determined as "suitable". The relevant attribute is an attribute which is not included in the search condition and is an attribute which appears uniquely in the search result. Details of the relevant attribute estimation processing will be described later with reference to FIG. 6.

Among the relevant attributes estimated by the relevant attribute estimation unit 111 and presented to the user, the query correction unit 112 adds the attribute specified by the user to the search condition and transmits the attribute to the query generation unit 109.

By repeatedly performing the above-described search condition input processing, search processing, and relevant attribute estimation processing, search results matching the user's search intention are narrowed down. This allows the user to efficiently select an appropriate set of attributes from the large number of attributes presented to the system. The appropriate attribute set obtained by the series of search processing may be optionally registered in the system by the user. In addition, the search may be streamlined by registering combinations of a plurality of attributes in the database as one new attribute.

The above is the operation of each unit in the search processing of the image search device 104. The registration processing and the search processing of the image search device 104 can also be performed simultaneously. In this case, the user can obtain high-quality search results from the newly registered data by reusing the attribute set obtained as a result of the search processing.

FIG. 2 is a block diagram showing an example of the hardware configuration of the image search system 100 of the present example. The image search device 104 includes a processor 201 and a storage device 202 connected to each other. The storage device 202 is configured with any type of storage medium. The storage device 202 is configured with a combination of a semiconductor memory and a hard disk drive.

The functional units such as the image input unit 105, the attribute recognition unit 106, the search condition input unit 108, the query generation unit 109, the image search unit 110, the relevant attribute estimation unit 111, and the query correction unit 112 shown in FIG. 1 are realized by the processor 201 executing a processing program 203 stored in the storage device 202. In other words, the processing executed by each functional unit is executed by the processor 201 based on the processing program 203. In addition, data of the image database 107 is stored in the storage device 202. In a case where the image search system 100 is configured with a plurality of devices for the purpose of processing load distribution and the like, the device provided with the image database 107 and the device executing the processing program 203 may be physically different devices connected by a network.

The image search device 104 further includes a network interface device (NIF) 204 connected to the processor 201. The image storage device 101 is assumed to be a NAS or SAN connected to the image search device 104 via the network interface device 204. The image storage device 101 may be included in the storage device 202.

FIG. 3 is an explanatory view showing a configuration and an example of data of the image database 107 of the present example. In the present embodiment, the information used by the system may be represented by any data structure without depending on the data structure. Although FIG. 3 shows an example of a table format, for example, data structures appropriately selected from a table, a list, a database or a queue can store information.

The image table 300 includes an image ID field 301, an image data field 302, and an attribute reliability field 303.

The image ID field 301 holds an identification number of each image data. The image data field 302 holds the image data used when displaying the search result in binary. The attribute reliability field 303 holds the reliability of the attribute recognized from the image. As described above, the reliability of the attribute is given by a real value of 0 or more and 1 or less, and the closer to 1, the higher the probability that the processing area includes the attribute. In addition, the attribute reliability field may hold a plurality of fields such as 304 and 305.

The table configuration of FIG. 3 and the field configuration of each table are merely examples, and tables and fields may be added according to an application. For example, information on the capturing time and location of the image may be held to be used for a search option or a search function based on image similarity may be added by holding image feature amounts. In addition, the table configuration may be changed as long as similar information is held.

As described above, the image search device 104 according to the present example can efficiently search for an image having a specific attribute by estimating the attribute set suitable for the user's search intention from a large number of attributes extracted from the input image. Here, in order to execute a search based on the attribute information from the search condition specified by the user, it is necessary to execute database registration processing of a search target. If the information of the configuration example of the database described in FIG. 3 is accumulated, the procedure at the time of registration may be arbitrary, but for example, the procedure shown in the flowchart of FIG. 4 can be used.

FIG. 4 is a diagram showing a processing flow of database registration. Hereinafter, each step of FIG. 4 will be described. The trigger of the data registration processing flow is that the user requests an image data group in a predetermined scene. Details of the trigger will be described later with reference to FIG. 10, which is an overall sequence diagram of registration processing and search processing. The image input unit 105 acquires image data from the image storage device 101 and converts the acquired image data into a format usable inside the system as needed (S401). For example, in a case where an input of moving image data is accepted, moving image decoding processing or the like of decoding moving image data into frames (still image data format) corresponds to conversion processing.

The attribute recognition unit 106 detects an area to be recognized from the input image. For example, in the case of an application for searching for a person, the whole body or face area of the person is detected (S402). A well-known person detection algorithm and a face detection algorithm can be used for the detection processing. In a case where continuous images of a plurality of frames are given as inputs, a plurality of area images may be associated and output by tracking an object between frames. In a case where area extraction is unnecessary, such as the case of extracting an attribute from the entire image, the processing of S402 may be skipped.

The attribute recognition unit 106 executes steps S404 to S405 for each of the areas obtained in step S402 (S403).

The attribute recognition unit 106 extracts a plurality of pieces of attribute information included in the image by image recognition processing (S404). This processing may use a different algorithm for each attribute or may use an algorithm capable of simultaneously recognizing multiple attributes. However, in the later search processing, it is assumed that the reliability of each attribute is the same measure, and therefore, in the case of using a plurality of different algorithms, normalization processing of the reliability is performed between the algorithms.

The attribute recognition unit 106 registers the area image obtained in step S402 in association with the attribute obtained in step S404 in the image database 107 (S405).

In a case where processing of predetermined image data included in the image storage device 101 is completed, the image search device 104 ends the processing (S407). In a case where new data such as a surveillance camera is continuously recorded in the image storage device 101, the process waits for new data to be stored, returns to step S401, and repeats the registration processing.

FIG. 5 is a diagram showing a processing flow of an image search using an attribute. The image search device 104 estimates relevant attributes and corrects the search condition based on the suitability determination of the user for the search result using an attribute set. Hereinafter, each step of FIG. 5 will be described.

The search condition input unit 108 receives the search condition input by the user (S501). The search condition is a set of attributes. For example, the user operates the check box for each attribute displayed on the display device 103 by the input device 102 to give the system attributes of the search condition. Alternatively, the attributes may be converted into an attribute set by processing the input speech or text.

The query generation unit 109 converts the search condition input in step S501 into a query vector for the image database 107 (step S502). As described above with reference to FIG. 1, the conversion method is represented by a numeric vector indicating the attribute to be used as 1 and the attribute to be excluded as 0.

The image search unit 110 searches for data in the image database 107 by using the query vector obtained in step S502 (step S503). In the search processing, as described above with reference to FIG. 1, the squared Euclidean distance between the numerical value vector generated from the attribute reliability of a comparison target data registered in the database and the query vector is calculated, and a predetermined number of pieces of data are obtained in ascending order of distance.

The image search device 104 displays the data acquired by the image search unit 110 on the display device 103 (step S504). Details of the display screen will be described later with reference to FIG. 8.

In a case where the image search device 104 receives a re-search instruction from the user, the image search device 104 performs re-search processing from step S506, and otherwise ends the processing (step S505).

The relevant attribute estimation unit 111 acquires the suitability evaluation of the search result acquired in step S503 (S506). The evaluation of the suitability is performed by confirming the search result displayed on the display device 103 by the user, and specifying the image in which the user has determined as "suitable" in the image search device 104 by using the input device 102. On the other hand, as described above, the suitability evaluation processing may be automated. That is, a search result having a Euclidean distance between vectors smaller than or equal to a predetermined value may be automatically determined as "suitable", and a search result having a Euclidean distance larger than or equal to the predetermined value may be automatically determined as "not suitable".

The relevance estimation unit 111 estimates relevant attributes not included in the search condition by using the suitability evaluation result acquired in step S506 (S507). The estimation method of the relevant attribute will be described later with reference to FIGS. 6 and 7.

The image search device 104 displays the relevant attribute estimated in step S507 on the display device 103 (S508).

The query correction unit 112 adds the attribute newly specified by the user to the search condition with reference to the relevant attributes displayed in step S508 and returns to step S502 to repeat the search processing (509). By repeating steps S502 to S509, it is easy to obtain a search result that matches the user's search intention.

FIG. 6 is a diagram showing the estimation processing (S507) of a relevant attribute in detail. In this processing, the suitability evaluation for the search result given by the user is used to estimate the attribute to be added or excluded from a re-search condition.

First, the user gives a flag of suitable/not suitable to the search result acquired from the image database 107 by using an initial search condition (601). Next, attributes associated with the data selected as suitable is obtained (602). It is assumed that attributes to be acquired individually are not included in the initial search condition. The information to be acquired is the reliability of recognition processing of each attribute. In 602 of FIG. 6, the longer attribute of the bar indicates higher reliability. Next, the obtained reliability data is subjected to statistical processing for each attribute to extract highly relevant attributes (603). For example, for each attribute in a plurality of pieces of selected data, if the variation of the reliability (variance value) is equal to or less than a predetermined value and the average value of the reliability is equal to or higher than a predetermined value, the attribute is determined as a candidate of an attribute to be added (604), and if the average value of reliability is equal to or less than the predetermined value, the attribute is determined as a candidate of an attribute to be excluded (605). In a case where the reliability is distributed in two or more points, such an attribute may be presented to the user as a branch candidate (606) because the order of existing search results is likely to change due to addition or exclusion of attributes.

FIG. 7 is a diagram showing the processing (S507) of relevant attribute estimation in a detailed flowchart. Each step will be described below.

The relevant attribute estimation unit 111 obtains a suitable search result for each image according to the suitability evaluation of the search result by the user (S701).

The relevant attribute estimation unit 111 executes step S703 on all the suitable search results (S702).

The relevant attribute estimation unit 111 acquires attribute data attached to the data of the search result from the image database 107 (S703). At this time, data of attributes already included in the search condition is not acquired.

The relevant attribute estimation unit 111 executes steps S706 and S707 for all the attributes to be acquired in step S703 (S705).

The relevant attribute estimation unit 111 analyzes the distribution of the reliability of the corresponding attribute acquired in steps S702 to S704 by statistical processing (S706).

Based on the statistical information obtained in step S706, the relevant attribute estimation unit 111 determines whether the corresponding attribute is a candidate to be added to the search condition, a candidate to be excluded, or a branch candidate (S707). As the determination method, for example, as described above as the description of FIG. 6, a method based on the average value and the variance value of the reliability of the attributes is used.

When the determination of addition, branching, or exclusion for all attributes is completed, the processing ends.

FIG. 8 is a diagram showing a configuration example of an operation screen for performing an image search by using the image search device 104 of the present example. In addition, similarly, FIG. 9 is an operation screen for performing an image search and is a diagram for describing screen transition from FIG. 8. First, FIG. 8 will be described.

The operation screen is presented to the user on the display device 103. The user operates a cursor 800 displayed on the screen by using the input device 102 to give the image search device 104 a processing instruction. The example of FIG. 8 is a stationary type of operation terminal but can take various forms as long as the device is capable of inputting and displaying. For example, as in a smartphone or a tablet, a touch operation may be used. In addition, a head-mounted display or a glasses-type device capable of displaying information may be used as a display device, and an input device that receives a voice input or a gesture may be used. In the case of using such a wearable portable device, since the simplification of the input of the search condition is required compared to a stationary type of computer, the relevant attribute estimation and presentation function of the present example exerts more remarkable effects.

The operation screen includes a search condition input area 801, a search button 802, a relevant attribute estimation button 803, and a search result display area 804.

The information displayed in the search condition input area 801 is output to the display device 103 by the search condition input unit 108 and the query correction unit 112. The information displayed in the search result display area 804 is output to the display device 103 by the image search unit 110.

On this screen, first, the user inputs an initial search condition (corresponding to S501). In the example of FIG. 8, in order to search for a person, a check box is displayed for each of a plurality of attributes. The user inputs attributes of a person to be searched for, into the system by clicking check boxes. In a case where there is a sample image of a person to be searched for, an interface for inputting the image may be prepared, and an attribute with a high degree of recognition reliability may be automatically checked after performing attribute recognition. In this case, the attribute used for the search may be corrected manually after the automatic input.

After the initial search condition is input, when the user clicks the search button 802, a search is executed (corresponding to S503). If there is no problem with the operation speed, the search may be automatically performed when the search condition is changed without explicitly pressing the search button.

FIG. 9 is a diagram showing a search result display screen after the search is executed.

When the search is executed, a list of search results 901 is displayed in the search result display area 804 (corresponding to S504). The user confirms the search result and determines whether or not the search result is suitable for the search intention (corresponding to S506). In suitability determination evaluation, as described above, among check boxes 902 prepared for each search result, the user clicks the check box of the image that the user determines as "suitable", and a suitable image is specified.

After inputting the suitability evaluation, when the user clicks the relevant attribute estimation button 803, the relevant attribute estimation processing is executed (corresponding to S507). At this time, as with the search, if there is no problem in speed, the relevant attribute estimation processing may be executed each time the suitability evaluation is input.

The attribute that has become a candidate for addition or exclusion by the relevant attribute estimation processing is highlighted in the search condition input area (903). The user corrects the search condition with reference to the highlighted attribute presented and repeatedly performs the search until the desired search result is obtained.

FIG. 10 is a sequence diagram showing an example of processing of the image search system 100 of the present example. FIG. 10 specifically shows a processing sequence among a user 1000, the image storage device 101, a computer 1001, and the image database 107 in the image registration and image search processing of the image search system 100 described above. The computer 1001 is a computer that realizes the image search device 104.

S1010 indicates registration processing, and S1020 indicates search processing. The registration processing S1010 includes the processing shown in steps S1011 to S1018. When the user 1000 issues a registration request (S1011), a series of registration processing is started (S1012). A specific use case of S1011 will be described later. The series of registration processing corresponds to the processing described in FIG. 4 and is repeatedly executed for the number of files specified by the user and for a predetermined time. The computer 1001 issues an image data acquisition request to the image storage device 101 (S1013) to acquire image data from the image storage device 101 (S1014). The computer 1001 detects an area to be processed from the acquired image (S1015) and extracts a plurality of pieces of attribute data from the detected area by image recognition (S1016). The obtained image and attribute data are registered in the image database 107 (S1017).

When the user 1000 inputs a search condition to the computer 1001 (S1021), search processing S1022 is executed. The search processing S1022 includes the processing shown in steps S1023 to S1030 and corresponds to the series of search processing described in FIG. 5. The computer 1001 converts the input search condition into a query vector (S1023), searches for an image from the image database 107 (S1024), and presents the search result to the user 1000 (S1025). The user 1000 confirms the search result and transmits the suitability evaluation to the computer 1001 (S1026). The computer 1001 acquires attribute data attached to the suitable search result from the image database 107 (S1027), estimates a relevant attribute (S1028), and presents the relevant attribute to the user 1000 (S1029). The user 1000 corrects the search condition with reference to the presented attribute and transmits the search condition to the computer 1001 (S1001). By repeatedly performing the series of search processing S1022, the user can obtain an attribute set for obtaining a high-quality search result.

Here, the positioning of S1011 for each use case will be described. For example, assuming that a police organization staff wants to conduct a search for a specific suspicious person from within the surveillance camera images of a specific station yard, S1011 corresponds to processing of requesting an image data group in which the suspicious person is considered to appear to a station server corresponding to the image storage device 101. In addition, assuming that a user, such as an employee of a large-scale commercial facility management company, wants to search for a lost child, a lost property, or the like from within the surveillance camera images in the facility, S1011 corresponds to processing of requesting an image data group in which the lost child, lost property, or the like are considered to appear to a server in the facility corresponding to the image storage device 101. It is also possible to narrow down the parameters of the data group to be acquired by specifically specifying the date, time zone, and the like by the user at the time of S1011.

In FIG. 10, the search processing S1020 is executed after the registration processing S1010 is completed but may be executed simultaneously. For example, the registration processing may be constantly performed on the images continuously input from the surveillance camera, and the user may execute search processing as needed to search for a person from the monitored images. In addition, the captured image may be managed in association with the ID of the surveillance camera that has captured the image. As a result, it is easy to specify the time and the imaging position at which the person and the like found by the search are imaged, and it is possible to improve the tracing efficiency of a search target.

As described above, according to the present image search system, it is possible to perform an image search according to the user's search intention in various use cases.

Example 2

In the relevant attribute estimation shown in Example 1, as shown in FIG. 6, the distribution of the reliability of the attributes is obtained by using only the search result of the suitability evaluation performed by the user. Here, in a case where the user evaluates only a few search results, there is a high possibility that sufficient data will not be collected for statistical analysis. Therefore, in the image search device 104 of Example 2, the relevant attribute estimation unit 111 automatically acquires data having similar appearance to the suitable search result specified by the user from the image database 107 and extends the data to be applied to statistical analysis.

FIG. 11 is a processing flow of relevant attribute estimation using similar data. FIG. 11 is an extension of the processing flow of FIG. 7. Specifically, S1101 to S1104 are inserted between S701 and S702. The description of the processing common to Example 1 is omitted.

The relevant attribute estimation unit 111 executes step S1102 on the suitable search result acquired in step S701 (S1101).

The relevant attribute estimation unit 111 acquires similar data of the search result from the image database 107. The similarity of data is assumed to be, for example, interpreting data with a small distance between vectors as similar data by using fixed-length vectors obtained by digitizing features of color and shape. In order to search similar data, the attribute recognition unit 106 needs to extract an image feature amount in addition to the reliability of the attribute and register the image feature amount in the image database 107.

FIG. 12 is an extension of the database configuration of FIG. 3 for a configuration suitable for Example 2. Specifically, in the extended database configuration, feature amount fields 1201 and 1202 are inserted in an image table 103 of FIG. 3. The description of the configuration common to Example 1 is omitted.

The feature amount may hold only one feature amount for a general purpose or may hold a feature amount specialized for each attribute. In a case where continuous time-series data is input like a moving image, the object tracking may be performed between frames by the attribute recognition unit 106, and a tracking ID may be registered in the video database 107. In this case, a tracking ID field 1203 is inserted in the image table 103. That is, data having the same tracking ID can be interpreted as similar data and used.

As described above, by performing the collection data extension processing described in Example 2, data sufficient for statistical processing can be collected, and the accuracy of the relevant attribute estimation can be improved.

Example 3

In the relevant attribute estimation unit 111 described in Example 1, since only the reliability of the image recognition processing is used to estimate the relevant attribute, the attribute extracted from only a specific area on the image is used for the search. For example, in the case of searching for a person, it may be assumed that only facial features are presented as relevant attributes and clothing features and the like are considered for candidates. Therefore, in the relevant attribute estimation unit 111 of Example 3, the attribute to be presented is selected by using the spatial distribution of the attributes.

The spatial distribution of attributes may be specified by a developer in advance at the time of system construction, and in attribute recognition by a convolutional neural network using deep learning, a feature amount map may be obtained by acquiring an image area where the output of a convolutional layer is activated for each attribute. For example, as shown in FIG. 13, when collecting feature amount maps of images with highly reliable attributes at the time of registration, an image area used for attribute recognition can be obtained as an attention probability map. In this case, when selecting relevant attributes, as shown in the lower part of FIG. 13, a map is prepared in which the attention probability maps of already selected attributes are superimposed, and it is determined whether or not new attributes can be arranged on the map. A specific processing flow will be described later with reference to FIG. 14.

FIG. 14 is a flowchart of estimation processing of relevant attributes using the attention probability map. Hereinafter, each step of FIG. 14 will be described.

The relevant attribute estimation unit 111 creates a cumulative attention probability map (S1401).

The relevant attribute estimation unit 111 executes steps S1403 to S1406 for the relevant attributes obtained as a result of the processing of FIG. 7 (S1402).

The relevant attribute estimation unit 111 acquires an attention probability map of the corresponding attribute (S1403).

The relevant attribute estimation unit 111 compares the attention probability map acquired in step S1403 with the cumulative attention probability map created in step S1401 to determine whether the corresponding attribute can be arranged (S1404). If the attribute can be arranged, the relevant attribute estimation unit 111 moves to step S1405, and if the attribute can not be arranged, the relevant attribute estimation unit 111 moves to step S1407 for the determination processing of a next attribute.

The relevant attribute estimation unit 111 adds the attention probability map acquired in step S1403 to the cumulative attention probability map (S1405).

The relevant attribute estimation unit 111 outputs the corresponding attribute as a relevant attribute (S1406).

When the determination processing for all the attributes is completed, the processing ends.

As described above, by executing the relevant attribute estimation processing described in Example 3, it is possible to present relevant attributes effective for searching to the user more comprehensively, thereby improving the accuracy of relevant attribute estimation.

Example 4

In the description of FIG. 1, it has been described that a combination of the attributes obtained by the search processing can be registered in the system as a new attribute. However, in a case where the relevance between attributes is low, it may be assumed that the combination is inappropriate as a new attribute. For example, the attributes of the face and the attributes of the shoes may not be relevant and may not be appropriate as a new attribute.

Therefore, the image search device 104 according to Example 4 uses the appearance frequency of the attributes and the spatial information to obtain the co-occurrence among the attributes and determines whether to present a combination as a candidate when adding a new attribute, based on the co-occurrence. The spatial information can use the attention probability map described in Example 3. An attribute with high similarity in the attention probability map is likely to be appropriate as a combination of new attributes. For example, since an "attribute in which the lower body clothes are indigo" and an "attribute in which jeans are worn" overlap in the attention probability, it is possible to suggest a candidate of a new attribute "in which the lower body is in indigo jeans".

FIG. 15 is a processing flow of adding a new attribute using co-occurrence between attributes.

The image search device 104 generates a pair of attributes from the attribute set obtained as a result of the series of search processing of FIG. 5 and executes steps S1502 to S1505 for each pair of attributes (S1501).

The image search device 104 acquires an attention probability map from each attribute of the pair of attributes (S1502).

The image search device 104 calculates the similarity between the two attention probability maps obtained in step S1502 (S1503). The similarity calculation is performed, for example, by vectorizing the attention probability maps to obtain a squared Euclidean distance, and the smaller the distance is, the higher the similarity is calculated.

If the similarity obtained in step 1503 is equal to or greater than a predetermined value (that is, the distance is equal to or less than a predetermined value), the image search device 104 executes step S1505, otherwise transitions to step S1506 to evaluate a next pair of attributes.

The image search device 104 presents the pair of attributes to the user as a new attribute candidate by using the display device 103.

When evaluation on all pairs of attributes is completed, the processing ends. In addition, it is also possible to evaluate a combination of three or more types of attributes by repeating the above processing.

As described above, by performing the new attribute generation processing described in Example 4, it is possible to generate a new attribute effective for searching to present the attribute to the user, thereby improving the accuracy of the image search.

The present invention is not limited to the examples described above but includes various modification examples. For example, the examples described above are described in detail in order to describe the present invention in an easy-to-understand manner and are not necessarily limited to those having all the configurations described. In addition, it is also possible to replace a part of the configuration of one example with the configuration of another example, and it is also possible to add the configuration of another example to the configuration of one example. Further, it is possible to add, delete, and replace another configuration for a part of the configuration of each example.

In addition, each of the configurations, functions, processing units, processing means, and the like described above may be realized by hardware, for example, by designing apart or all thereof with an integrated circuit. In addition, each of the above configurations, functions, and the like described above may be realized by software by a processor interpreting and executing a program that realizes each function. Information such as a program, a table, a file, and the like for realizing each function can be placed in a recording device such as a memory, a hard disk, or a solid state drive (SSD) or a recording medium such as an IC card, an SD card, or a DVD.

Furthermore, control lines and information lines indicate what is considered to be necessary for the description, and not all control lines and information lines are necessarily shown in a product. In practice, almost all configurations may be considered to be mutually connected.

The invention claimed is:

1. An image search device comprising:
   a search condition input unit that receives a search condition for searching for an image;
   a query generation unit that generates a first query based on the search condition;
   an image search unit that searches for an image in a database based on the first query;
   a relevance estimation unit that estimates relevance between a plurality of images selected by a predetermined operation among images hit by a search, wherein
   the relevance estimation unit acquires an attribute included in the image and reliability of the attribute from the database for each of the plurality of images and estimates relevance between the plurality of images by predetermined statistical processing using the reliability, and
   the relevance estimation unit analyzes distribution of the reliability in each attribute by the predetermined statistical processing and estimates relevance between the plurality of images by setting an attribute with a variance value of reliability less than or equal to a predetermined value and an average value of reliability greater than or equal to a predetermined value as a candidate for an attribute to be added and setting an attribute with an average value of reliability equal to or less than the predetermined value as an attribute to be excluded;
   a query correction unit that generates a second query based on the relevance between the plurality of images; and
   a function of displaying the second query generated by the query correction unit on an interface.

2. The image search device according to claim 1, wherein the interface includes a relevant attribute estimation button, and
   a trigger of the predetermined operation is selection of an image and pressing the relevance estimation button by a user.

3. The image search device according to claim 2, wherein the search condition is determined by the user selecting a specific attribute from a plurality of attributes displayed on the interface or by analyzing a query image input from the user.

4. The image search device according to claim 3, further comprising:
   an image input unit that acquires an image data group from a storage device based on a predetermined condition specified by the user and registers the image data group in the database after performing predetermined conversion processing.

5. The image search device according to claim 4, wherein the relevance estimation unit selects an image whose similarity with an image selected by the user is equal to or greater than a predetermined value from the database and adds the image as a target of the relevance estimation.

6. The image search device according to claim 5, wherein the relevance estimation unit creates an attention probability map indicating an area in which highly reliable attributes are distributed, for each attribute, and outputs the attention probability map to the interface.

7. The image search device according to claim 6, wherein the relevance estimation unit calculates similarity of the attention probability map for each pair of attributes and outputs the pair of attributes whose similarity is equal to or greater than a predetermined value to the interface as a new attribute.

8. An image search method comprising:
   a step of receiving a search condition for searching for an image by a search condition input unit;
   a step of generating a first query based on the search condition by a query generation unit;
   a step of searching for an image in a database based on the first query by an image search unit;
   a step of estimating relevance between a plurality of images selected by a predetermined operation among images hit by a search, by a relevance estimation unit;
   a step of acquiring an attribute included in the image and reliability of the attribute from the database for each of the plurality of images and estimating relevance between the plurality of images by predetermined statistical processing using the reliability, by a relevance estimation unit;
   a step of analyzing distribution of the reliability in each attribute by the predetermined statistical processing and estimating relevance between the plurality of images by setting an attribute with a variance value of reliability less than or equal to a predetermined value and an average value of reliability greater than or equal to a predetermined value as a candidate for an attribute to be added and setting an attribute with an average value of reliability equal to or less than the predetermined value as an attribute to be excluded, by a relevance estimation unit; and a step of generating a second query based on the relevance between the plurality of images by a query correction unit.

* * * * *